(12) United States Patent
Waxham et al.

(10) Patent No.: US 6,688,563 B1
(45) Date of Patent: Feb. 10, 2004

(54) SUPPORT FOR A MOUSE SURFACE

(75) Inventors: Warren A. Waxham, Jamestown, NY (US); Michael G. Wisniewski, North East, PA (US)

(73) Assignee: Weber Knapp Company, Jamestown, NY (US)

(*) Notice: Subject to any disclaimer, the term of this patent is extended or adjusted under 35 U.S.C. 154(b) by 0 days.

(21) Appl. No.: 10/170,952

(22) Filed: Jun. 13, 2002

(51) Int. Cl.[7] .................................................. B43L 15/00
(52) U.S. Cl. ................. 248/118.1; 248/118; 248/278.1; 248/289.11
(58) Field of Search .............................. 248/118, 118.5, 248/289.11, 917, 918, 278.1, 291.1, 282.1, 284.1, 118.1; 108/138, 28, 143; 400/715

(56) References Cited

U.S. PATENT DOCUMENTS

| | | | | |
|---|---|---|---|---|
| 4,863,124 A | * | 9/1989 | Ball et al. ...................... | 108/28 |
| 4,974,808 A | * | 12/1990 | Ball ........................... | 248/639 |
| 5,975,469 A | * | 11/1999 | Chen ........................ | 248/118.1 |
| 6,086,034 A | * | 7/2000 | McAllister et al. ....... | 248/278.1 |
| 6,296,215 B1 | * | 10/2001 | McCoy et al. ............ | 248/284.1 |
| 6,296,216 B1 | * | 10/2001 | Law et al. ............. | 248/289.11 |
| 6,347,771 B1 | * | 2/2002 | Lauzon et al. .............. | 248/118 |
| D455,756 S | * | 4/2002 | Tonizzo et al. ............ | D14/457 |
| 6,505,566 B1 | * | 1/2003 | Foster et al. ................. | 108/138 |

OTHER PUBLICATIONS

Prior commerically available supports for mounting a mouse support for movement relative to a keyboard supporting tray are as follows:

* cited by examiner

Primary Examiner—Ramon O. Ramirez
Assistant Examiner—Tan Le
(74) Attorney, Agent, or Firm—Simpson & Simpson, PLLC

(57) ABSTRACT

A support is provided for mounting a mouse surface on a keyboard supporting tray for movement about a first vertical axis for moving the mouse surface between right and left hand use positions disposed adjacent right and left hand ends of a keyboard supported by the tray; for movement about a second axis disposed within a plane arranged parallel to said first axis; and for movement about a horizontal axis for forwardly and rearwardly tilting the mouse surface relative to the ends of the keyboard and selectively positioning upper and lower surfaces of the mouse surface vertically above and below the keyboard. The support is cantilever supported on the tray by a pivot connection for defining the first axis and includes a bearing surface selectively engageable with an upwardly facing, arculate surface portions of the tray for providing vertical support for the mouse surface remotely of the first axis.

20 Claims, 4 Drawing Sheets

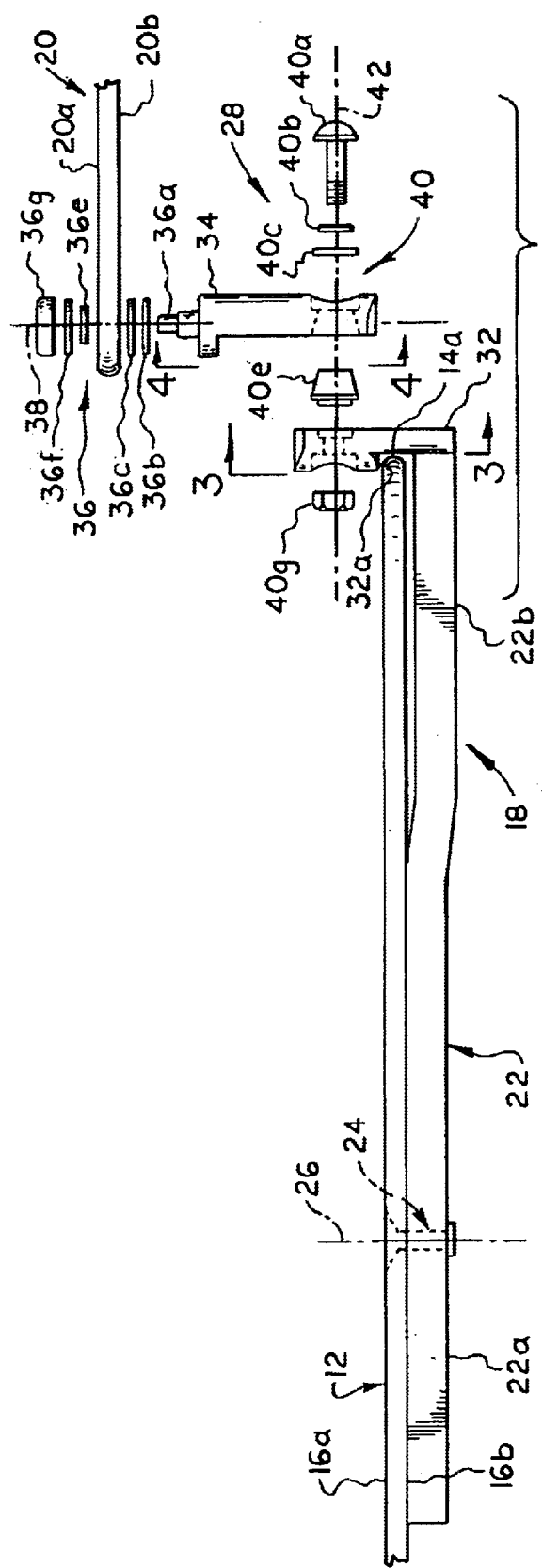
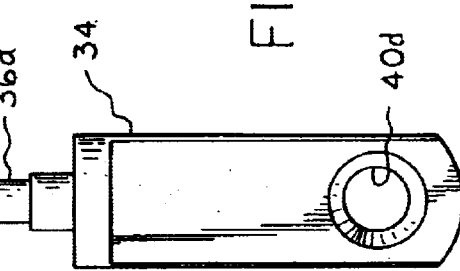
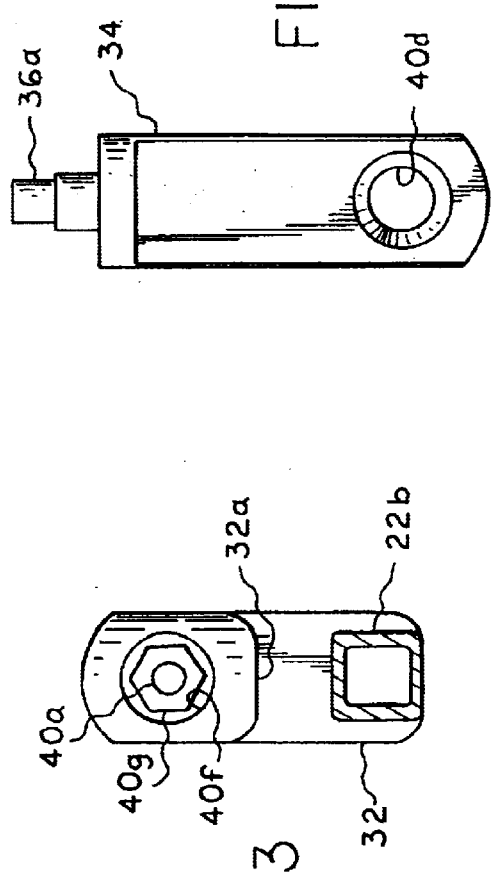

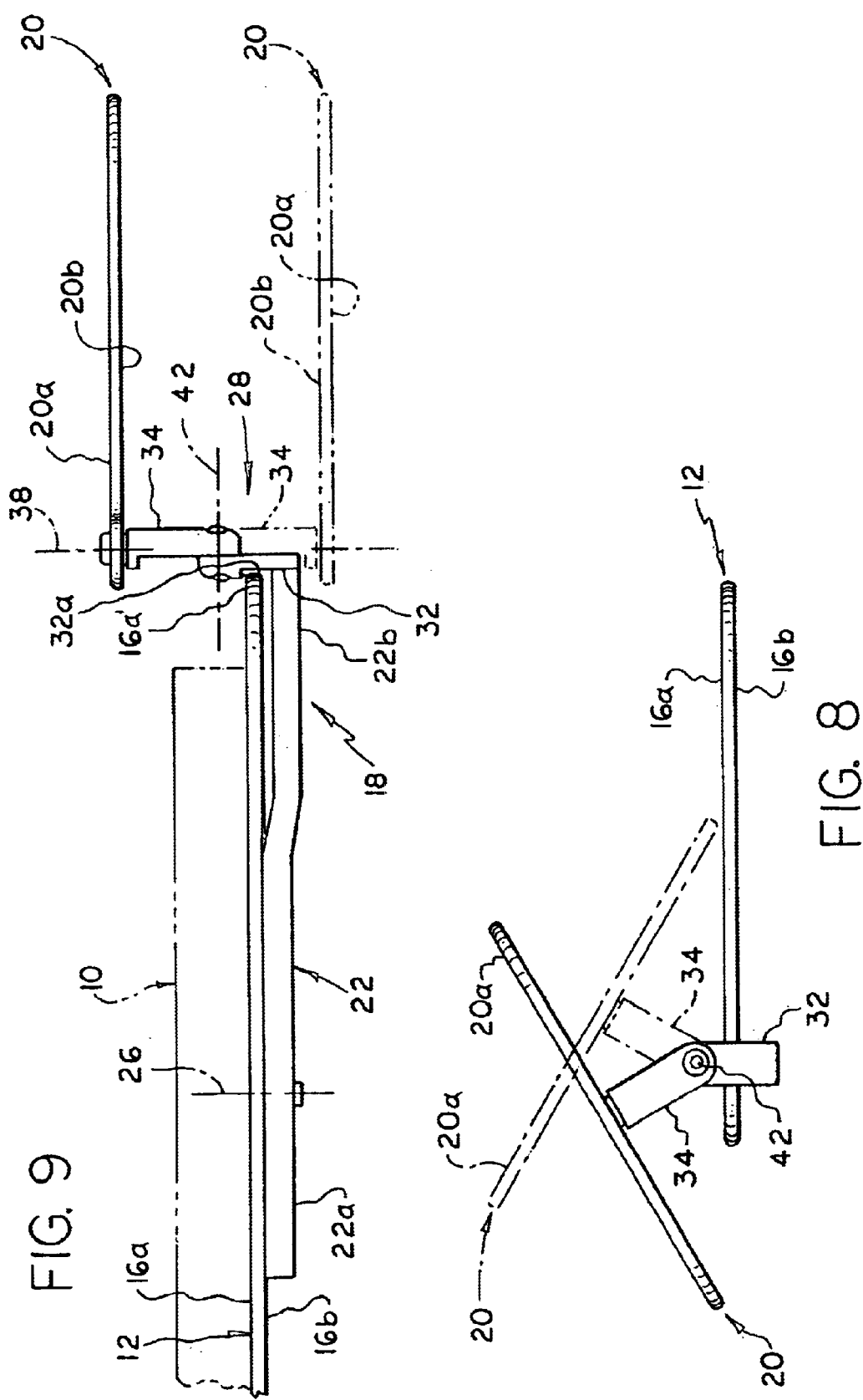

SUPPORT FOR A MOUSE SURFACE

FIELD OF THE INVENTION

The invention relates means for mounting a mouse support for user induced movement relative to a keyboard.

BACKGROUND OF THE INVENTION

Various types of supports have been proposed for use in mounting a mouse surface on a keyboard supporting tray, but none have provided for universal adjustments of a mouse support or for multiple use positions of a mouse surface without use of one or more hand operated clamps for releasably maintaining a mouse surface in one or more of such use positions.

Further, it is known to provide a cantilever support for mounting a mouse surface for swinging movement about a vertical axis relative to a keyboard supporting tray. A disadvantage of known designs is that the application of loading to the mouse surface during use may result in undesirable deflections of such surface and high loadings on the pivot mechanism defining the first axis which may shorten its useful life.

SUMMARY OF THE INVENTION

The present invention relates broadly to a support for mounting a mouse surface on a keyboard supporting tray, and more particularly to the combination of a tray, a mouse surface and a support for providing for universal adjustment of the positions of the mouse support relative to the tray.

More particularly, in a preferred construction, the mouse surface is supported for swinging movement about a first vertical axis between right and left hand use positions relative to a keyboard supported on an upwardly facing surface of the tray; for swinging movement about a second axis for moving the mouse surface forwardly and rearwardly of the keyboard, as well as to selectively place the mouse surface in sue and storage positions relative to the tray; and for swinging movement about a horizontal axis forwardly and rearwardly tilting the mouse surface relative to the keyboard and selectively positioning the mouse surface vertically above and below such keyboard.

The support is cantilever supported below the tray by a pivot connection defining the first axis and includes a bearing surface selectively engageable with the upwardly facing surface of the tray for providing vertical support for the mouse surface remotely of the first axis.

BRIEF DESCRIPTION OF THE DRAWINGS

The nature and mode of operation of the present invention will now be more fully described in the following detailed description taken with the accompanying drawings wherein:

FIG. 2 is a partial, exploded front elevational view of the combination shown in FIG. 1;

FIG. 3 is a view taken generally along the line 3—3 in FIG. 2;

FIG. 4 is a view taken generally along the line 4—4 in FIG. 2;

FIG. 8 is a schematic view showing forwardly and rearwardly directed tilting movement of the mouse surface relative to the tray; and FIG. 9 is a schematic view showing the extent of vertical swinging of the mouse surface between upper and lower use positions.

DETAILED DESCRIPTION OF THE PREFERRED EMBODIMENT

Figure 1:
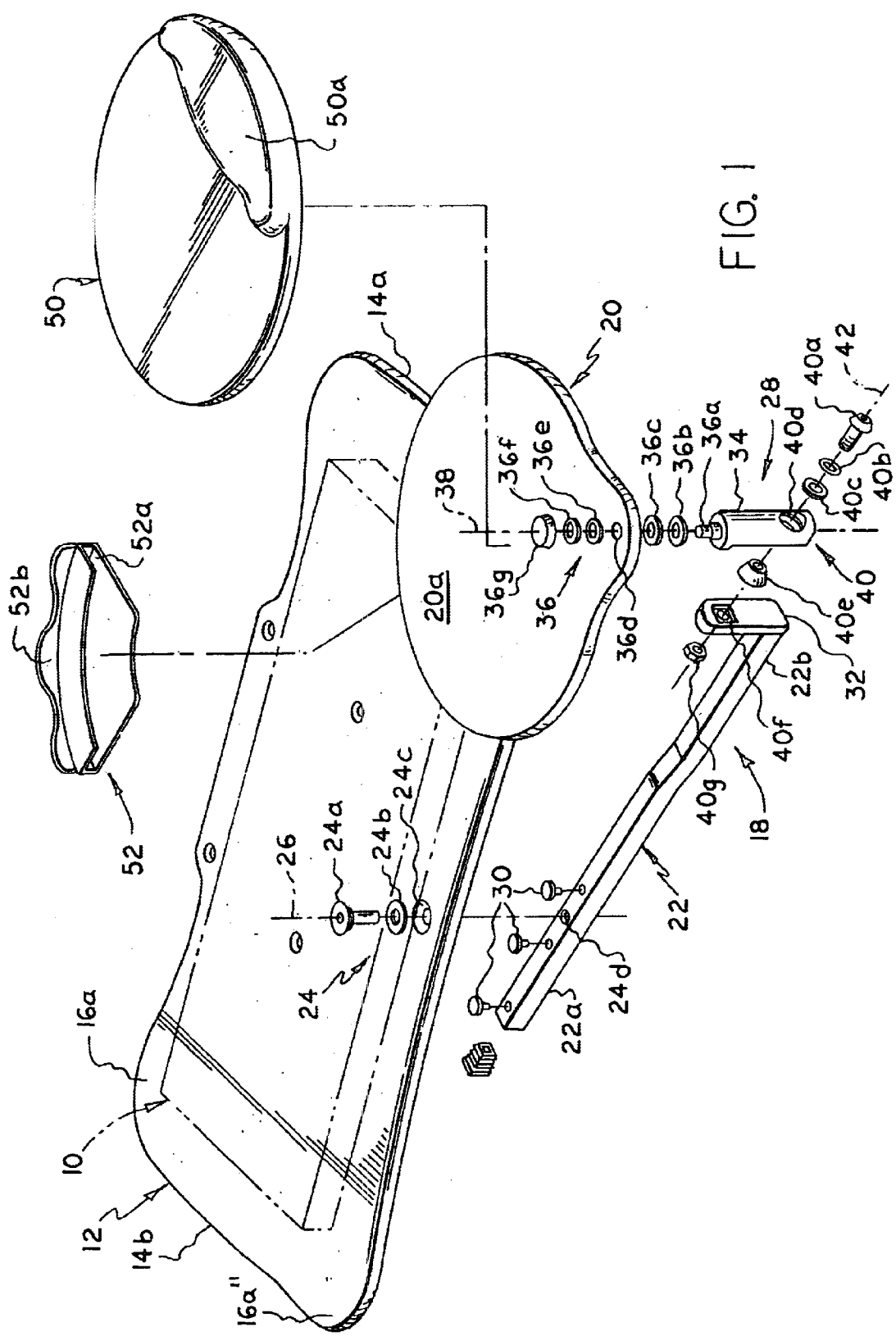
FIG. 1 is an exploded front prospective view of a keyboard supporting tray, a mouse surface and support for mounting the mouse surface for movement relative to the tray formed in accordance with present invention.

Reference is first made to FIG. 1, wherein a tray suitable for use in supporting a typical computer keyboard 10 at a work station, not shown, is generally designated as 12 and shown as having opposite ends 14a and 14b, and an upwardly facing surface 16a adapted for supporting the keyboard. Tray 12 is also provided with a downwardly facing surface 16b arranged generally parallel to surface 16a, as shown in FIGS. 2, 8 and 9.

Tray 12 may be supported for movement relative to the work station by diverse mechanisms, as is well known in the art.

In accordance with the present invention, a support generally designated as 18 is provided for supporting a mouse surface 20 for substantial universal movement relative to tray 12, and thus keyboard 10, when the latter is placed on surface 16a. Support 18 is shown in the drawings as generally including an elongated arm 22 having first and second ends 22a and 22b; a pivot device or mechanism 24 for mounting the arm on tray 12 beneath its downwardly facing surface 16b for pivotal movement about a first vertical axis 26 extending vertically through arm first end 22a and surfaces 16a and 16b; and a connecting means generally designated as 28 for connecting mouse surface 20 to arm second end 22b.

Pivot device 24 may be suitably formed, such as by passing a bearing rivet 24a downwardly through a bearing washer 24b and holes 24c and 24d formed in tray 12 and arm 22, respectively, and then overturning the lower end of the rivet to retain the tray and arm in assembled condition. If desired, a plurality of headed friction devices 30, shown only in FIG. 1, may be mounted on arm 22 for underengagement with tray surface 16b for purposes retarding free swinging movement of the arm 22 about axis 26 in the absence of the application of manual force to mouse surface 20 or arm 22 by a user of keyboard 10. Preferably, tray ends 14a and 14b are shaped such that tray upwardly facing surface 16a defines a first and second arcuately-shaped bearing surfaces 16a' and 16a", which are disposed equidistant from axis 26, as best shown in FIGS. 1, 2 and 5–7.

Connecting means 28 is best shown in FIGS. 1 and 2 as including a first post 32 fixed, as by welding, to upstand from arm second end 22b; a second post 34; a second pivot device or mechanism 36 for mounting mouse surface 20 for pivotal movement relative to the second post about an axis 38; and a third pivot device or mechanism 40 for mounting the second post, and thus the mouse surface, for pivotal movement relative to the first post about an axis 42. When arm 22 is mounted on tray 12 for pivotal movement about first axis 26 and connecting means 28 assembled in the manner to be described, axis 42 is generally horizontally disposed and axis 38 lies within a plane disposed essentially parallel to first axis 26.

Pivot device 36 may be suitably formed, such as by forming the upper end of second post 34 with a bearing pin 36a arranged to pass upwardly through a Belvelle washer 36b, a plastic washer 36c, a hole 36d formed in mouse surface 20, a second plastic washer 36e, a metal washer 36f and then overturning the free end of the bearing pin to retain the mouse surface and second post in assembled condition. A plastic cover cap 36g may be snap-fitted over the washer 36f.

Pivot device 40 may be suitably defined, such as by passing a machine screw 40a through a steel washer 40b, a bellevilles washer 40c, a stepped hole 40d formed in second post 34, a non-pivoting cone clutch 40e, a stepped hole 40f formed in first post 32 and a lock nut 40g.

Mouse surface 20 may be variously defined, but preferably includes a generally circular plate having oppositely facing parallel surface portions 20a and 20b of a size sufficient to freely support a typical computer operation control mouse, not shown, for desired manually induced computer controlling movements. A mouse may be placed directly on and in engagement with surface portions 20a and 20b, when same are selectively placed in an upwardly facing use position, such as shown for the case of surface portion 20a in FIGS. 1, 2 and 5–9, and for the case of surface portion 20b only in broken line in FIG. 9. Alternatively, a mouse may be supported by a mouse supporting pad 50 adapted to be removably applied to one or the other of surface portions 20a and 20b when same are placed in their upwardly facing use position. Pad 50 may be in the form of a flat, thin, flexible sheet or provided on one side with an enlarged cushioning area 50a serving to define a palm or wrist rest.

A mouse catcher device 52 preferably formed of a resiliently deformable metal or plastic material is provided with a clamp portion 52a adapted to be snap-fitted over an edge of mouse surface 20 or over the mouse surface and pad 50, when placed thereon, in order to arrange an integrally formed arcuate rim portion 52b to upstand above that one of surface portions 20a or 20b arranged in an upwardly facing orientation in order to prevent movement of a mouse off of such one of the mouse surface portions, particularly when same is tilted rearwardly about axis 42, as shown for the case of surface portion 20a in broken line in FIG. 8.

Figure 5:
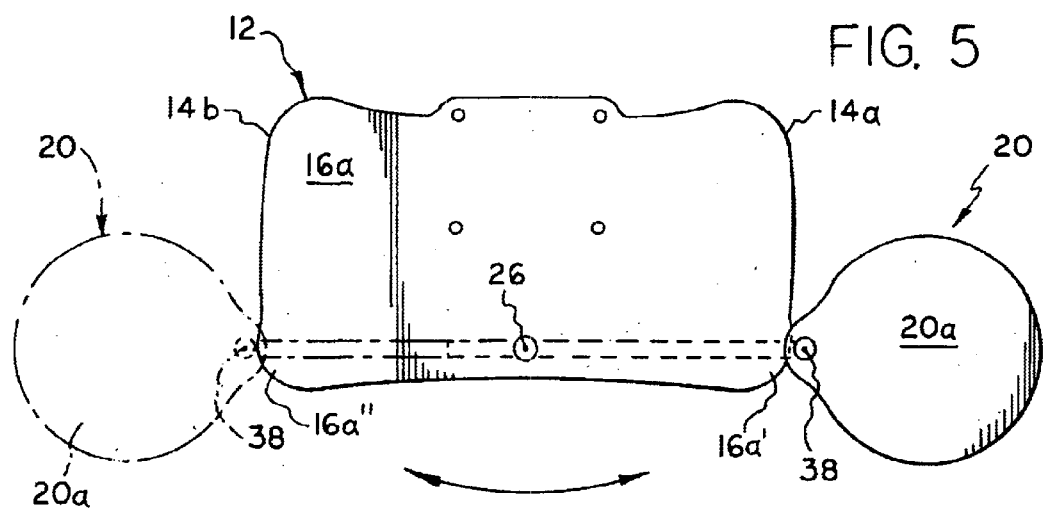
FIG. 5 is a schematic view showing alternate right and left hand use positions of the mouse surface.

In operation, a user may manually place mouse surface 20 selectively in either right or left hand use positions disposed outwardly of tray end edges 14a and 14b, as shown in full and broken line, respectively, in FIG. 5. When in such use positions, a user may selectively arranged the mouse surface portions to face upwardly, as shown for the case of surface portion 20a and 20b in full line and broken line, respectively, in FIG. 9. Mouse surface 20a may be used in generally horizontal upwardly facing positions as it pivots about axis 38 both inwardly above a keyboard and out board of opposite ends 14a and 14b.

Figure 6:
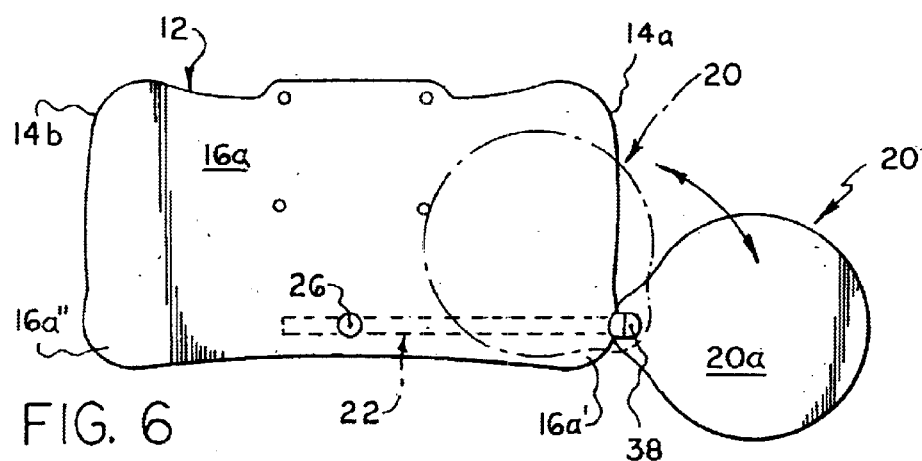
FIG. 6 is a schematic view showing alternative use and storage positions of the mouse surface.
Figure 7:
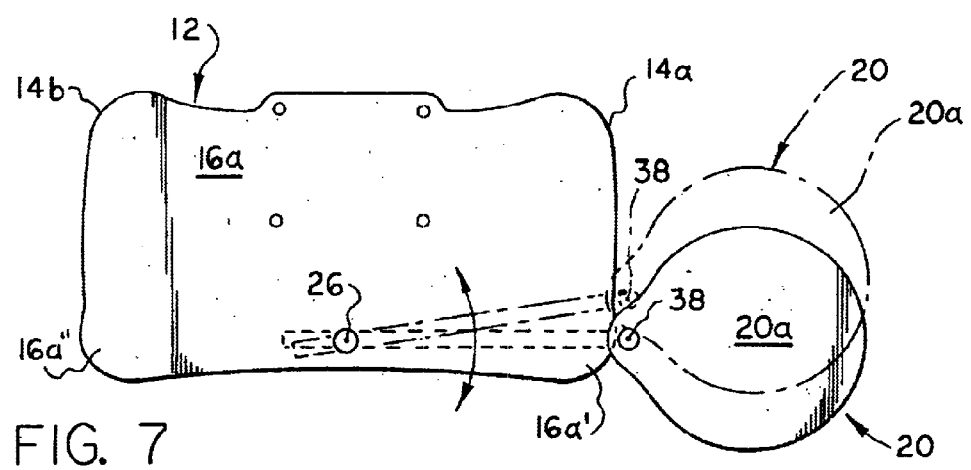
FIG. 7 is a schematic view showing the range of travel of the mouse surface during which its downwardly directed movement relative to the tray is limited by engagement of the mouse surface support with the tray.

Mouse surface 20 may be placed in a storage position beneath tray 12 by first pivoting the mouse surface about axis 42 to place surface portion 20b in an upwardly facing orientation and then pivoting the mouse surface about axis 38 between its use and storage positions, shown in full and broken line in FIG. 6. Also, while in its use positions, mouse surface 20 may be pivoted about axis 42 selectively into forwardly and rearwardly inclined positions, as shown in full and broken line, respectively, in FIG. 8.

Still further, it is a feature of the present invention that connecting means 28 is adapted to cooperate with tray surface 16a in order to limit the extent of downwardly directed movement of mouse surface 20 upon the application of downwardly directed loading thereto during use. This is accomplished in accordance with a presently preferred construction by providing first post 32 with a downwardly bearing surface 32a, shown in FIG. 2 as being adapted to placed in overlying engagement with tray surface arcuate bearing surface 16'a, when mouse surface 20 is moved into its right hand use position. Bearing surface 32a may be alternatively placed in bearing, load supporting engagement with arcuate bearing surface 16"a, when mouse surface 20 is moved into its left hand use position shown in broken line in FIG. 5. While in its use positions, mouse surface 20 may be pivoted horizontally about axis 26 through a small arc without removing surface 32a from overlying relation with arcuate bearing surface 16a' and 16a", as shown for the case of bearing surface 16a' in FIG. 7. By this arrangement, loadings on pivot device 24 may be substantially reduced during use.

What we claim is:

1. A support for mounting a mouse surface for movement relative to a tray having opposite ends and upwardly and downwardly facing surfaces; and adapted for supporting a keyboard on said upwardly facing surface intermediate said ends, said support including an arm having first and second ends, pivot means for mounting said arm on said tray for pivotal movement about a first vertical axis extending through said first end of said arm and said surfaces of said tray; and connecting means for connecting said mouse surface to said second end of said arm, said arm having a length exceeding the distance between said axis and one of said ends of said tray for positioning said mouse surface outwardly of said one of said ends of said tray, and said connecting means defines a bearing surface arranged to engage said upwardly facing surface of said tray adjacent said one of said ends for limiting the extent of downward movement of said mouse surface upon the application of downwardly directed loading to said mouse surface relative to said tray during use.

2. The support of claim 1, wherein said connecting means defines a second pivot means for mounting said mouse surface on said second end of said arm for pivotal movement about a second axis disposed within a plane arranged parallel to said first vertical axis.

3. The support of claim 1, wherein said connecting means defines a pivot means for mounting said mouse surface on said second end of said arm for pivotal movement about a horizontal axis.

4. The support of claim 3, wherein said mouse surface includes parallel first and second mouse surface portions, and said mouse surface is moveable about said horizontal axis for alternatively positioning said first and second surface portions in an upwardly facing orientation.

5. The support of claim 4, wherein a mouse catcher is removably connected to said mouse surface and has a portion thereof arranged to upstand from that one of said mouse surface portions arranged in said upwardly facing orientation to prevent movement of a mouse off of said one of said mouse surface portions when same is tilted rearwardly relative to a horizontal orientation.

6. The support of claim 1, wherein said connecting means includes a first post upstanding from said second end of said arm, a second post arranged to extend normal to said mouse surface, and a pivot means for mounting said second post on said first post for pivotal movement about a horizontal axis for tilting said mouse surface relative to said upwardly facing surface of said tray.

7. The support of claim 6, wherein said mouse surface includes parallel first and second mouse surface portions, and said mouse surface is moveable about said horizontal axis for alternatively positioning said first and second surface portions in an upwardly facing orientation.

8. The support of claim 7, wherein said mouse surfaces are connected to said second post for pivotal movement about an axis extending normal to said surface portions and arranged to lie within a plane disposed parallel to said first axis.

9. The support of claim 7, wherein a mouse catcher is removably connected to said mouse surface and has a portion thereof arranged to upstand from that one of said mouse surface portions arranged in said upwardly facing orientation to prevent movement of a mouse off of said one of said mouse surface portions when same is tilted rearwardly relative to a horizontal orientation.

10. The combination of a tray for supporting a keyboard; a mouse surface for supporting a mouse; and a support for movably mounting said mouse surface on said tray, said tray having opposite ends and upwardly and downwardly facing surfaces and adapted for supporting a keyboard on said upwardly facing surface intermediate said ends, said support including an arm having first and second ends, pivot means for mounting said arm on said tray for pivotal movement about a first vertical axis extending through to said surfaces of said tray and said first end of said arm, and connecting means for connecting said mouse surface to said second end of said arm, said arm having a length exceeding the distance between said axis and one of said ends of said tray for positioning said mouse surface outwardly of said one of said ends of said tray, said connecting means defines a bearing surface arranged for engagement with said upwardly facing surface of said tray adjacent said one of said ends for limiting the extent of downward movement of said mouse surface relative to said tray upon the application of downwardly directed loading to said mouse surface during use, and said one of said ends of said tray includes an arcuate bearing surface portion extending concentrically of said axis and arranged for bearing engagement with said bearing surface throughout its arcuate length.

11. The combination of claim 10, wherein said axis is disposed equidistant from said ends of said tray, said ends of said tray are each provided with one of said arcuate bearing surface portions, and said arm is swingable about said axis to alternatively position said bearing surface for engagement with said arcuate bearing surface portions.

12. The combination of claim 11, wherein said connecting means defines a second pivot means for mounting said mouse surface on said second end of said arm for pivotal movement about a second axis disposed within a plane arranged parallel to said first vertical axis.

13. The combination of claim 12, wherein said connecting means additionally defines a pivot means for mounting said mouse surface on said second end of said arm for pivotal movement about a horizontal axis.

14. The combination of claim 13, wherein said mouse surface includes parallel first and second mouse surface portions, and said mouse surface is moveable about said horizontal axis for alternatively positioning said first and second surface portions in an upwardly facing orientation.

15. The combination of claim 14, wherein a mouse catcher is removably connected to said mouse surface and has a portion thereof arranged to upstand from that one of said mouse surface portions arranged in said upwardly facing orientation to prevent movement of a mouse off of said one of said mouse surface portions when same is tilted rearwardly relative to a horizontal orientation.

16. The combination of claim 11, wherein said connecting means includes a first post upstanding from said second end of said arm, a second post extending normal to said mouse surface, and a pivot means for mounting said second post on said first post for pivotal movement about a horizontal axis for tilting said mouse surface relative to said upwardly facing surface of said tray, and said first post defines said bearing surface.

17. The combination of claim 16, wherein said mouse surface includes parallel first and second mouse surface portions, and said mouse surface is moveable about said horizontal axis for alternatively positioning said first and second surface portions in an upwardly facing orientation, and said second post is connected to said mouse surface for pivotal movement about an axis extending normal to said surface portions and arranged to lie within a plane disposed parallel to said first axis.

18. The combination of a tray for supporting a keyboard; a mouse surface for supporting a mouse; and a support for movably mounting said mouse surface on said tray, said tray having opposite ends and upwardly and downwardly facing surfaces and adapted for supporting a keyboard on said upwardly facing surface intermediate said ends, said support including an arm having first and second ends, pivot means for mounting said arm on said tray beneath said downwardly facing surface for pivotal movement about a first vertical axis extending through to said surfaces of said tray and said first end of said arm, and connecting means for connecting said mouse surface to said second end of said arm, said axis is disposed equidistant from said ends of said tray, said arm is swingable about said axis to alternatively position said mouse surface adjacent said ends of said tray, said mouse surface includes parallel first and second mouse surface portions, said connecting means includes a first post upstanding from said second end of said arm, a second post connected to and extending normal from one of said mouse surface portions, a pivot means for connecting said second post to said first post for pivotal movement about a horizontally disposed axis for alternatively positioning said first and second mouse surface portions in an upwardly facing orientation, and said second post is pivotally connected to said one of said mouse surface portions for relative pivotal movement about an axis extending normal to said one of said mouse supporting portions and arranged to lie within a plane disposed parallel to said first axis.

19. The combination of claim 18, wherein a mouse catcher is removably connected to said mouse surface and has a portion thereof arranged to upstand from that one of said mouse surface portions arranged in said upwardly facing orientation to prevent movement of a mouse off of said one of said mouse surface portions when same is tilted rearwardly relative to a horizontal orientation, and a mouse supporting pad is removably fitted to said mouse surface portions.

20. The combination of claim 18, wherein said upwardly facing surface of said tray is provided with a pair of arcuate bearing surface portions arranged one adjacent each of said ends of said tray, and said first post is provided with a bearing surface arranged to alternatively engage with said bearing surface portions incident to placement of said mouse surface adjacent said ends of said tray for limiting the extent of downward movement of said mouse surface upon the application of downwardly directed loading to said mouse surface during use.

* * * * *